United States Patent [19]

Swanbery

[11] Patent Number: 5,420,865

[45] Date of Patent: May 30, 1995

[54] METHOD AND APPARATUS FOR ALIGNMENT OF FRAMES OF INFORMATION

[75] Inventor: Adam R. Swanbery, Chantilly, Va.

[73] Assignee: Alcatel Data Networks, Reston, Va.

[21] Appl. No.: 255,377

[22] Filed: Jun. 8, 1994

[51] Int. Cl.$^6$ ............................................. H04L 7/10
[52] U.S. Cl. ................................. 370/103; 375/357; 375/358
[58] Field of Search ................ 370/100.1, 103, 105.1, 370/108, 119; 375/106, 107, 108, 109, 121; 371/42, 47.1

[56] References Cited

U.S. PATENT DOCUMENTS

| 4,592,051 | 5/1986 | Frizlen | 370/103 |
| 4,606,023 | 8/1986 | Dragoo | 370/103 |
| 5,110,558 | 8/1978 | Kageyama et al. | 375/109 |
| 5,291,529 | 3/1994 | Crook et al. | 375/109 |

OTHER PUBLICATIONS

International Standard ISO/IEC 4335 "Information Technology-Telecommunications and Information Exchange Between Systems" Ref. No. ISO/IEC 4335:1993(E) Fifth Edition.
International Standard ISO/IEC 3309 "Information Technology-Telecommunications and Information Exchange Between Systems" Ref. No. ISO/IEC 3309:1993 (E).
"Data and Computer Communications" by William Stallings, Ph.D. Second Edition, pp. 148–152 from Data Link Control.

Primary Examiner—Benedict V. Safourek
Attorney, Agent, or Firm—Ware, Fessola, Van Der Sluys & Adolphson

[57] ABSTRACT

A frame alignment method and system for communicating frames of information between at least two devices. A 'start of alignment sequence' is used to cause a device that is in the misaligned state to inform the other device of this state condition in such a way that the other device itself is caused to transition to the misaligned state. The 'start of alignment sequence' is therefore a frame alignment error when a device is in the aligned state. Each device in the misaligned state repetitively transmits the 'start of alignment sequence'. Each device in the misaligned state transitions to the realignment state upon detection of the 'start of alignment sequence'. When in the realignment state the device transmits the 'end of alignment sequence' to cause the other device to transition to the aligned state if the other device is in the realignment state. Devices in the aligned state transmit any pending frames of information and remain in this aligned state until a frame alignment error, including a 'start of alignment sequence', is detected. A system for implementing this frame alignment method is also described.

28 Claims, 6 Drawing Sheets

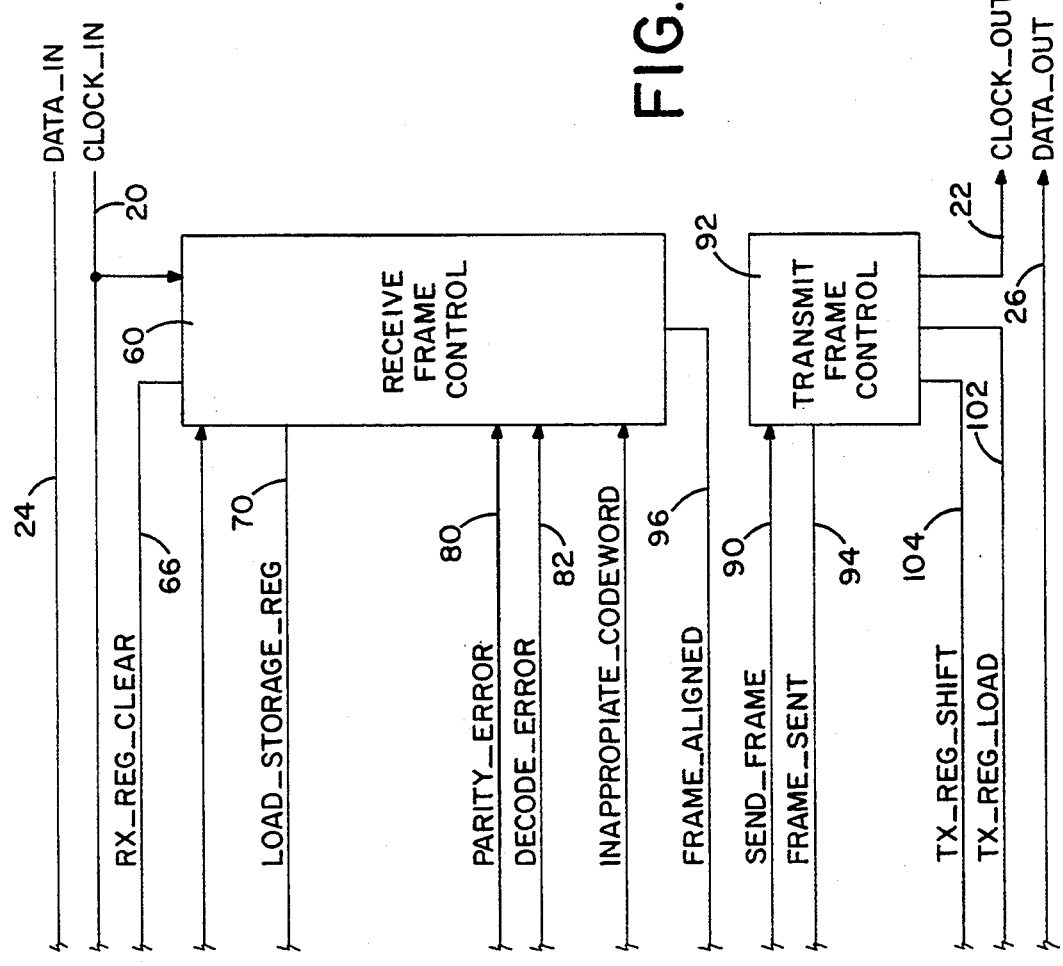

METHOD AND APPARATUS FOR ALIGNMENT OF FRAMES OF INFORMATION

TECHNICAL FIELD

The present invention relates to a frame alignment method and an associated system for aligning frames of information which are communicated between two asynchronous devices.

BACKGROUND OF THE INVENTION

When two asynchronous devices communicate via serial dam streams, some mechanism must be used to delineate the start and end of individual pieces of information commonly referred to as frames of information. Such a mechanism or protocol should provide four basic functions for each communicating device:

1) achieve frame alignment;
2) detect alignment errors;
3) notify the other device if an alignment error is detected; and
4) recover from alignment errors.

The two most prevalent dam-link communication protocols that include a framing mechanism are ISO Standard DIS 3309.2 (HDLC) and ANSI Standard T1.107 (CCITT G.733). Each of these standards and their variations are insufficient with respect to achieving the mechanism presented above.

Variations of HDLC include SDLC, LAPB, and LAPD. All of these protocols transmit dam as a large block with framing overhead appended to the beginning and end of the block. These protocols effectively establish frame alignment prior to each transmission, unlike the present invention. Moreover, these protocols do not detect alignment errors until the entire block of information has been transmitted. The present frame alignment method and system does not reestablish frame alignment for each transmission, but rather only performs a frame alignment when a frame alignment error is detected. The frame alignment error is detected shortly after it occurs, allowing for faster recovery from the error. The present invention also contains less framing overhead for data transfers less than 122 bytes.

In addition, by breaking the transmitted data into smaller frames during transmission, the present invention allows a logical connection to be established or disestablished in the opposite direction of transmission, providing a true full-duplex communications path. Because HDLC sends data in a contiguous block, it is unable to send control information relating to data reception while the block is being transmitted.

The ANSI T1.107 and the CCITT G.733 standards are commonly referred to in the art as "T1" standard in the United States. The T1 carrier system is a time division multiplex system for digitized information, and has frame alignment information contained in a constant serial bit stream. Although the framing information overhead is low, there is no built-in error notification protocol. Moreover, there is no mechanism to stop the physical transmission when there is no data to transmit. The present frame alignment method and system is able to only transmit when there is data to send, thereby reducing power consumption and system noise.

Thus, none of the prior art communication standards combine error notification and frame alignment, wherein frame alignment is both fast and efficient. The prior art also does not combine such a protocol with true full-duplex communication and low power consumption, wherein the associated clock may be disabled between valid communications.

SUMMARY OF THE INVENTION

A primary object of the present invention is to provide a frame alignment method for synchronous communication of frames of information between two asynchronous devices which achieves the desired goals of frame alignment, detection of alignment errors, notification of alignment errors and recovery from alignment errors. The invention achieves these goals by each device being initially set to a misaligned state, wherein each device when in the misaligned state repetitively transmits a 'start of a alignment sequence', wherein each device when in the misaligned state transitions to a realignment state upon receipt of a 'start of alignment sequence'; wherein each device in the realignment state transmits an 'end of alignment sequence' consisting at least of a single information unit in a second logic state; wherein each device in the realignment state remains in the realignment state until an 'end of alignment sequence' is received, at which time the device transitions to an aligned state, and wherein each device in the aligned state remains in the aligned state until a frame alignment error is detected, at which time the device enters the misaligned state; and further wherein at least a 'start of alignment sequence' is a frame alignment error.

Another object of the present invention is such a frame alignment method wherein the size of the 'start of alignment sequence' is the same as the size of the frames of information.

A still further object of the present invention is such a frame alignment method wherein the size of the 'end of alignment sequence' is the size of, or a multiple of, the size of the frames of information.

The present invention is also directed to a system for frame alignment of frames of information performing the above-described methodology.

One specific system is a system for aligning frames of information communicated synchronously between at least two devices, wherein each frame of information comprises a plurality of bits, with at least one bit in a second logic state designating the end of each frame, with the system having means for interconnecting the devices to each other, and further wherein the system comprises means for receiving and storing information units from the interconnecting means, means for detecting frame alignment errors with respect to each received frame of information, each device repetitively transitioning to a misaligned state and transmitting the 'start of alignment sequence', each sequence consisting of P information units all in a first logic state, if a frame alignment error is detected, each device having means for transitioning to a realignment state if a 'start of alignment sequence' is detected after detecting a frame alignment error is detected, each device having means for transmitting an 'end of alignment sequence', consisting at least of one unit of information in the second logic state when in the realignment state, and each device having means for transitioning to the aligned state if an 'end of alignment sequence' is detected when in the realignment state; and further wherein a frame alignment error includes a 'start of alignment sequence'.

For such a system, each device includes a receive shift register for receiving incoming units of information from another device, a receive storage register for temporary storage of the received units of information into frames of information, a decoder module that determines if a frame of information contains data or control information and for activating the code words if a control frame is detected. The decoder also determines the parity of the incoming frames of control information and determines if a code word is a legal or illegal code word.

Each device further includes a transmit and receive control module connected to the decoder which can determine if a control frame having a legal code word has been received at an inappropriate time.

Each device also includes an encoder module that encapsulates outgoing data into frames of information and also determines the correct coding for each outgoing control frame. If a frame alignment signal is not active, the encoder generates the 'start of alignment sequence' instead of control or data frames. It repeats this action until the frame alignment signal is active, at which time the encoder first sends the 'end of alignment sequence'. A transmit shift register provides data to the outgoing stream of information while a transmit frame control module manages the actual transmission of frames.

Finally, a receive frame control module performs the frame alignment state transitions. This module causes the device to enter the misaligned state at power up or when a frame alignment error is detected. It deactivates the frame alignment signal at such times, which forces the generation of the 'start of alignment sequence'. In this misaligned state, the receive frame control module clears the receive shift register such that it contains all '0's. The receive frame control module also monitors the receive shift register to determine when a 'start of alignment sequence' has been received. When this occurs, the receive frame control module transitions to the realignment state and activates the frame alignment signal. This activation in turn causes the encoder to send the 'end of alignment sequence'. When the 'end of alignment sequence' is detected, the receive frame control module enters the aligned state. When the receive frame control module is in the aligned state, it determines if each frame is properly received and provides for transmission of outgoing frames of information.

BRIEF DESCRIPTION OF THE DRAWINGS

FIGS. 7A and 7B is an overall block diagram for a system implementing the frame alignment method in each communicating device.

FIG. 7 is a diagram showing how FIGS. 7A and 7B are put together.

BEST MODE FOR CARRYING OUT THE INVENTION

Figure 1:
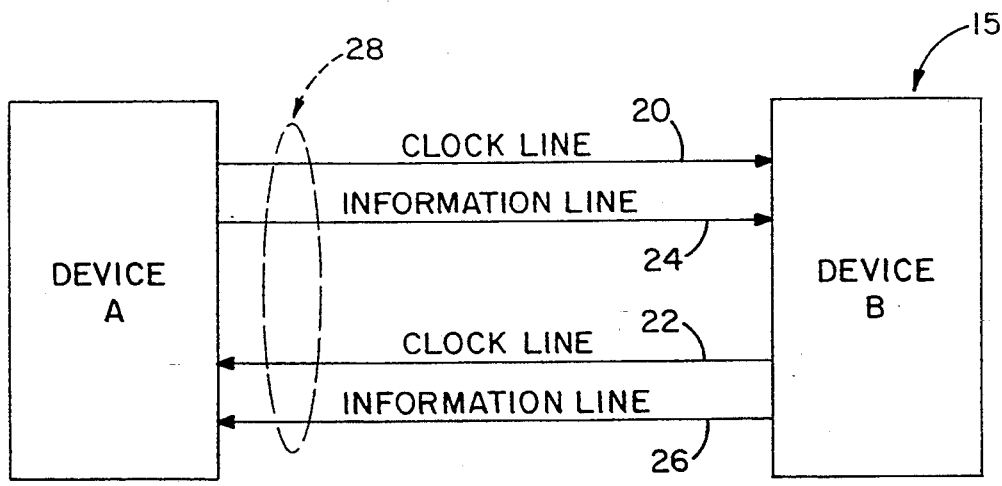
FIG. 1 is a block diagram showing the serial links between two asynchronous devices communicating synchronously with each other.

As seen in FIG. 1, device A and device B, according to the present invention, communicate clock signals on clock lines 20 and 22 and information signals on information lines 24 and 26 between each other as shown. These devices may represent cards forming part of communication switch, wherein each card can communicate with any other card via a serial communication link such as shown diagrammatically by reference numeral 28. The clock signals on lines 20 and 22 provide timing information for the units of information transmitted as information signals on lines 24 and 26.

Figure 2:
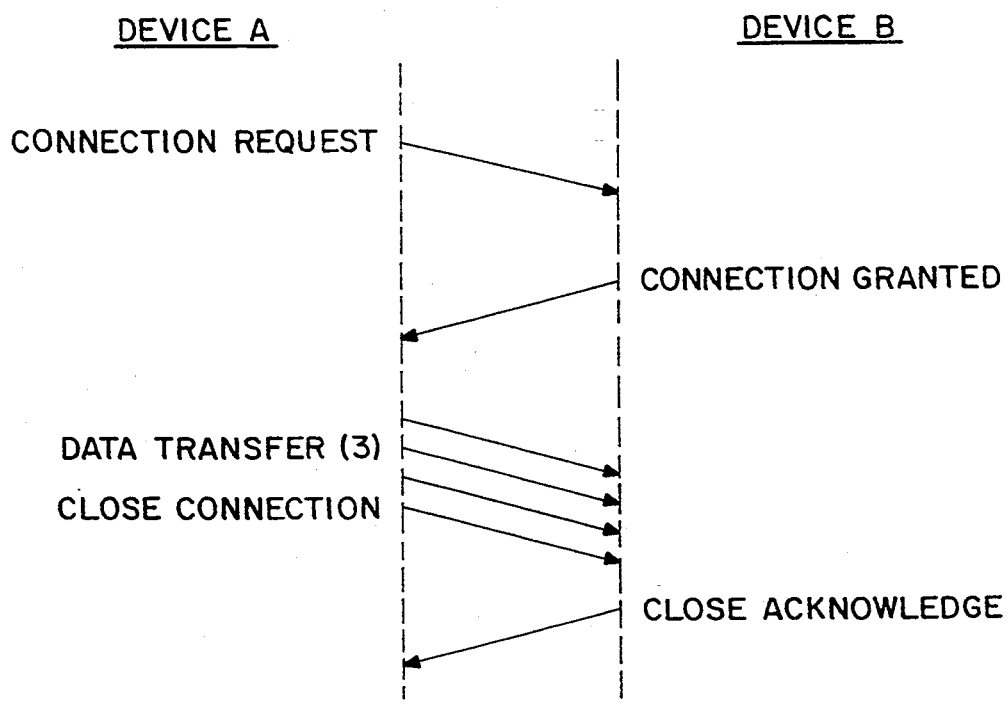
FIG. 2 is a diagrammatic representation of typical control codes and data communicated between two asynchronous devices which are communicating synchronously with each other.

A device sends information to another device by establishing a logical connection and then transmitting the desired information. A typical manner of establishing a logical connection is shown in FIG. 2. As seen there, a connection is established using a plurality of information units called control frames and data is passed using a plurality of information units called data frames. Each control frame contains a code word. As seen in FIG. 2, device A sends a control frame called a Connection Request code word to device B. Upon receipt of this code word by device B, device B sends a Connection Granted code word back to device A. Upon receipt by device A of the Connection Granted code word, device A transfers data, such as the three data frames shown, to device B. The logical connection is completed by the transfer of a Close Connection code word from device A to device B, with device B acknowledging receipt of the Close Connection code word by transmitting a Close Acknowledge code word back to device A.

For each of these communications, a block of data is encapsulated into one or more frames of information which are transferred from device A to device B, or vice versa. Because true full-duplex communication is supported, frames of information can be transferred from A to B and B to A simultaneously. Frames for the receiving entity (e.g. Connection Granted code word) are multiplexed into the same information line as frames for the transmitting entity (e.g. data frames).

Figure 3:
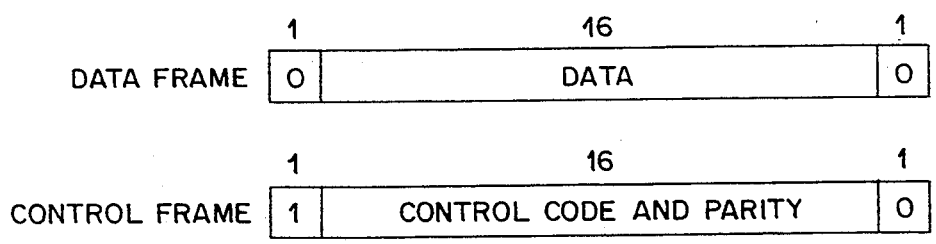
FIG. 3 is a diagram illustrating the difference between a data frame and a control frame used in accordance with the present invention.

A preferred frame format is shown in FIG. 3, where it is seen that both data frames and control frames each comprise 18 total bits of information, with the first bit of each frame distinguishing between the two frame types. As is also seen in FIG. 3, the last bit of each frame, regardless of its type, is a '0' bit. This bit is called a frame ending marker. Other bit or bit patterns may be used to designate a frame ending marker.

It is also seen that data frames therefore contain 16 bits of data while control frames contain control codes such as those shown in FIG. 2. A complete set of control codes is presented in Table 1.

TABLE 1

| Legal Code Words | |
|---|---|
| ACRONYM | CODE WORD |
| RTS | Connection Request |
| CTS | Connection Granted |
| END | Close Connection |
| ACK | Close Acknowledge |
| NACK | Negative Acknowledge |
| BSI | Buffer Swap Interrupt |

A parity bit is also used in conjunction with the control codes to protect the integrity of control frames. Such parity, although advantageous, is not required for the general implementation of the frame alignment method and system of the present invention.

Figure 4:
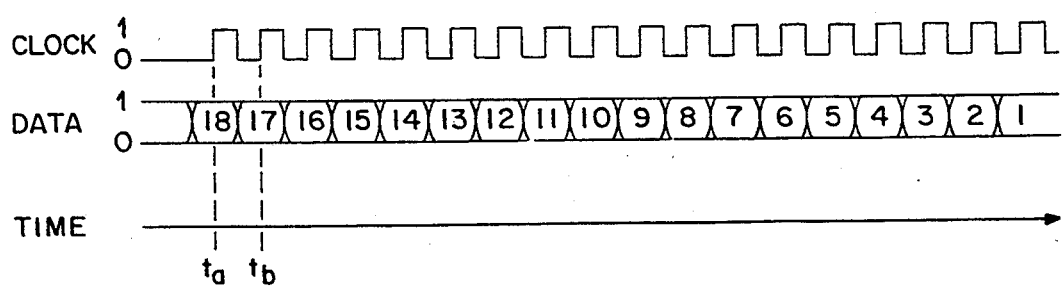
FIG. 4 is a frame timing diagram for transmission of frames of information between two devices.

The frame timing for the transmission of control and data frames is best seen in FIG. 4. There, in conjunction with FIG. 1, it is seen that control and data frames are passed from one device to another over information lines 24 and 26, where the associated clock lines 20 and 22 are only active (that is, in the '1' single state) when a frame is being transmitted and otherwise, the value of the clock line is '0'. Data is received on the destination device starting at the rising edge of the associated clock signal. Thus for example, bit number 18 of the illustrated data frame is received by the receiving device at time instant '$t_a$' while bit 17 is received at time instant '$t_b$'.

In order to extract frames from the information line, a device must be able to delineate the start and end of individual frames. If a frame alignment error occurs, the error must be detected and the device must realign frames of the incoming data stream. Additionally, the transmitting device must be notified of any detected frame alignment error.

A methodology for achieving the above requirements is set forth below:

Alignment Detection

Figure 5:
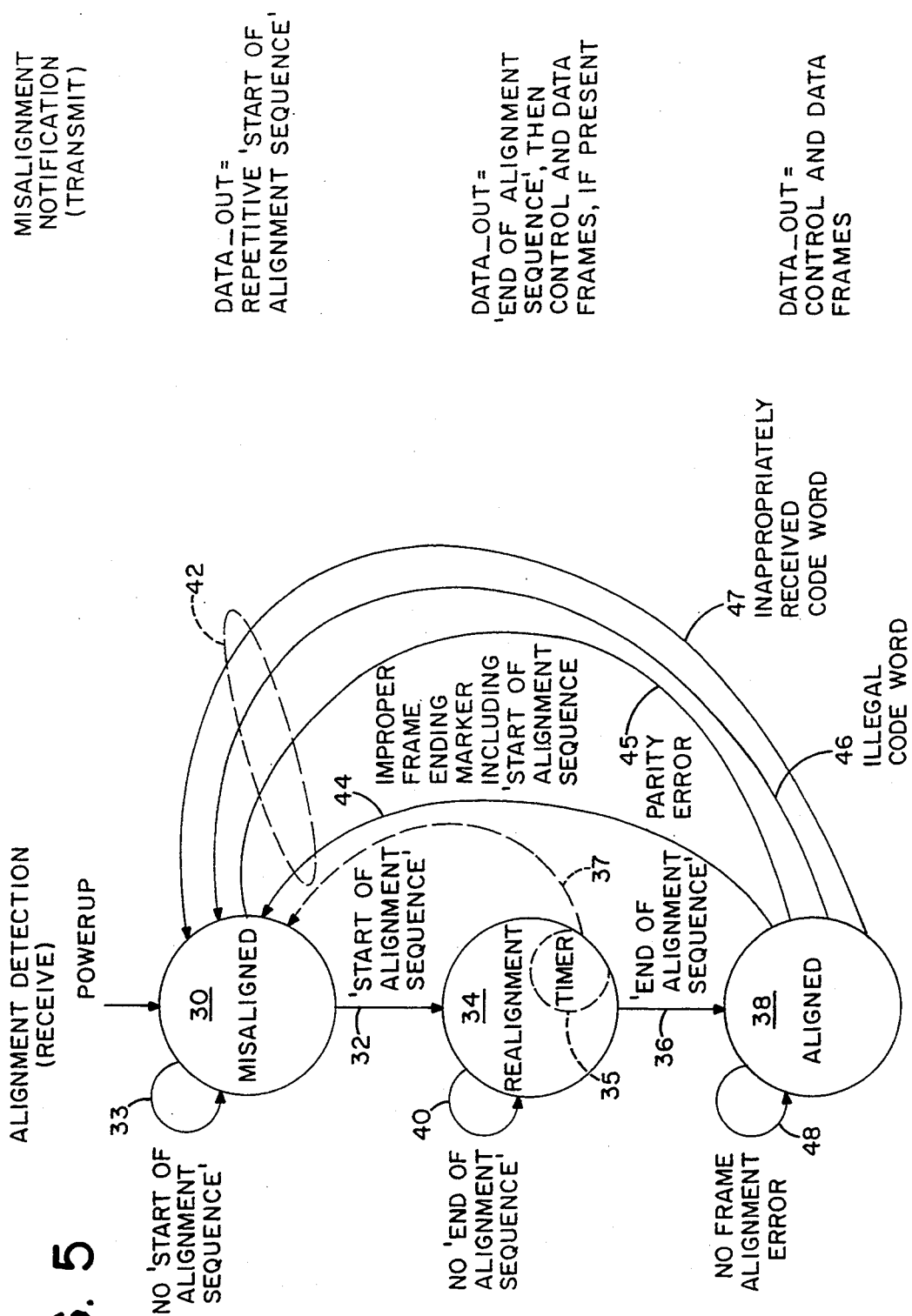
FIG. 5 is an alignment state diagram illustrating the states associated with a device depending upon perceived events, as well as the action taken by the device based upon its state.

As seen in FIG. 5, the receiving device, which may be a card or any other type of device, initializes to a misaligned state 30 after power up. While in this state, the device looks for what is termed the 'start of alignment sequence' in the serial data stream. This 'start of alignment sequence' for a preferred embodiment of the present invention is P consecutive bits all in logic state '1', where P is the number of bits in a frame; namely, 18. It is of course apparent that 'P' could be set to a different number.

Figure 6:
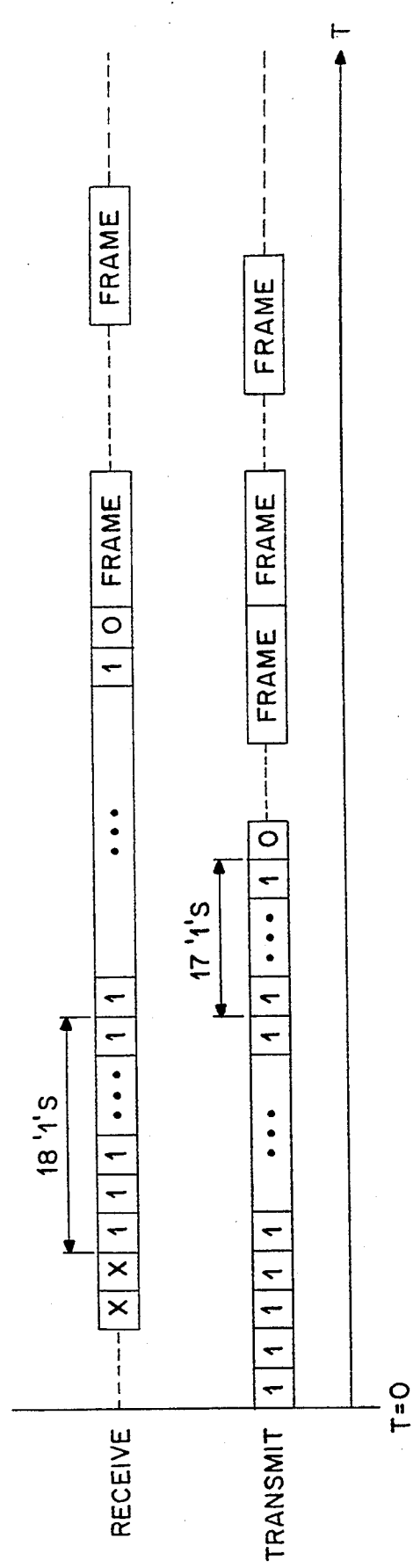
FIG. 6 is an alignment time-space diagram of a variation with respect to the end frame alignment sequence.

As seen in FIG. 5, a device which is in the misaligned state 30, transitions to the realignment state 34 upon detection of the 'start of alignment sequence', event 32. If no 'start of alignment sequence' is detected, event 33, the device remains in the misaligned state. In one embodiment of the present invention, an 'end of alignment sequence' is defined as a single bit in the logic '0' state. As seen in FIG. 6, the 'end of alignment sequence' is preferably defined as P-1 bits in logic state '1', followed by 1 bit in logic state '0', where P is the number of bits in one frame of information. This 'end of alignment sequence' may also comprise multiples of P bits in the logic '1' state before the P-1 bits in the logic '1' state followed by 1 bit in the logic '0' state. In this way, the overall alignment sequence ('start of alignment sequence' and 'end of alignment sequence') is always a multiple of the frame size. It has been found that this arrangement improves overall reliability by eliminating the possibility of a single bit error from corrupting the entire alignment sequence. When a device in the realignment state detects 'the end of alignment sequence', event 36, it transitions to the aligned state 38.

The device, once in the aligned state, remains in that state provided no frame alignment error is detected, event 48. The types of frame alignment errors are set forth in Table 2.

TABLE 2

FRAME ALIGNMENT ERROR TYPES

Improper frame ending marker is detected (see FIG. 5, event 44). In the preferred embodiment this occurs when the last bit of a frame is detected as a '1' instead of the expected '0' (see FIG. 3). This detection is performed by the receive frame control module 60 (see Hardware Implementation below).
A control frame has a parity bit defined as frame[1]= ~(frame[16] ^ frame[15] ^ ... ^ frame[2]), where '^' is the exclusive-OR operation and '~' is the logical NOT operation. A frame alignment error may first be detected as an incorrect parity value (See FIG. 5, event 45). Parity checking is performed by decoder module 72.
The code word associated with a received control frame is illegal, meaning that there is no code word with this identity (See FIG. 5, event 46). In other words, the code word is not set forth in Table 1. This checking for valid code words is performed by decoder module 72.
The code word contained in the received control frame may be a legal code word, but is received at an unexpected time for a logical connection to be present (See FIG. 5, event 47). This condition is defined as an inappropriate code word. As shown in FIG. 9, an example of an inappropriate code word is the reception of a Close Connection code word when no Connection Request code word was previously received. The transmit and receive control module 76 performs this detection function.

Realignment

In order to notify another device of a frame alignment error, the device which detects a frame alignment error repetitively sends the 'start of alignment sequence'. This sequence causes a frame alignment error to be detected on the other device, which in turn results in that other device entering the misaligned state. While in the misaligned state, the other device also repetitively sends the 'start of alignment sequence'. As shown above, a 'start of alignment sequence' is P '1's, where P is preferably equal to the number of bits in one frame; that is, 18. Thus a device detecting a frame alignment error in fact transmits the 'start of alignment sequence'.

Table 3 illustrates a typical example of how the present frame alignment method operates when one of two devices detects a frame alignment error. Thus Device B detects a frame alignment error and enters the misaligned state 30. While in this state it transmits the 'start of alignment sequence' to Device A. Device B continues to transmit the 'start of alignment sequence' until it enters the realignment state.

TABLE 3

| TIME INTERVAL # | DEVICE A STATE | DEVICE A ACTION | DEVICE B STATE | DEVICE B ACTION |
| --- | --- | --- | --- | --- |
| 1 | Aligned | Transmit Control and Data frames, if present, to B | Aligned | Transmit Control and Data frames, if present, to A |
| 2 | Aligned | Transmit Control and Data frames, if present, to B | Misaligned (e. g. detected parity error in received Control Frame) | Repetitively Transmit 'start of alignment sequence' to A (first such |

TABLE 3-continued

| TIME | DEVICE A | | DEVICE B | |
|---|---|---|---|---|
| INTERVAL # | STATE | ACTION | STATE | ACTION |
| | | | see FIG. 5, transition, event 45 | sequence transmitted this time interval) |
| 3 | Misaligned (received first 'start of alignment sequence' from B) see FIG. 5, transition event 44 | Transmit first 'start of alignment sequence' to B | Misaligned | Continue to repetitively transmit 'start of alignment sequence' to A (second such sequence transmitted this time interval) |
| 4 | Realignment (received second 'start of alignment sequence' from B) see FIG. 5, transition event 32 | Transmit 'end of alignment sequence' then Control and Data frames, if present, to B | Realignment (received first 'start of alignment sequence' from A) | Transmit 'end of alignment sequence', then Control and Data frames, if present, to A |
| 5 | Aligned (received 'end of alignment sequence' from B) see FIG. 5, transition event 36 | See interval #1 above | Aligned (received 'end of alignment sequence' from A) see FIG. 5, transition event 36 | See interval #1 above |

The first 'start of alignment sequence' sent by Device B to Device A, causes Device A to transition to the misaligned state 30 since the 'start of alignment sequence' is an invalid frame ending marker (see FIGS. 3 and 5, event 44). In this state, Device A starts to transmit the 'start of alignment sequence' to Device B. It is important to note that as Device A is transmitting its first 'start of alignment sequence' to Device B, Device B is transmitting at least its second 'start of alignment sequence' to Device A. By so doing each device causes the other device to enter the realignment state 34 (see FIG. 5, event 32).

When Device A and Device B are in the realignment state, they each transmit the 'end of alignment sequence' to the other device, which causes the other device to enter the aligned state 38 (see FIG. 5, event 36).

Thus an automatic mechanism is provided whereby a device detecting a frame alignment error of any type informs the other device of this error by causing that other device to enter the misaligned state. The 'start of alignment sequence' which may initiate this change of state is in fact the same message which then causes each device to enter the realignment state, where each device transmits an 'end of alignment sequence' that causes the other device to enter the aligned state.

It should also be noted that if a device does not properly detect an 'end of alignment sequence', a mechanism can be provided to cause it to return to the misaligned state. As seen in FIG. 5, a timer 35 can be added associated with the realignment state with the timer starting a countdown when the device transitions to the realignment state. If the timer times out (event 37), the device transitions to the misaligned state where it then causes the other device to transition to the misaligned state and thus re-initializes the frame alignment process.

Hardware Implementation

Figure 7A:
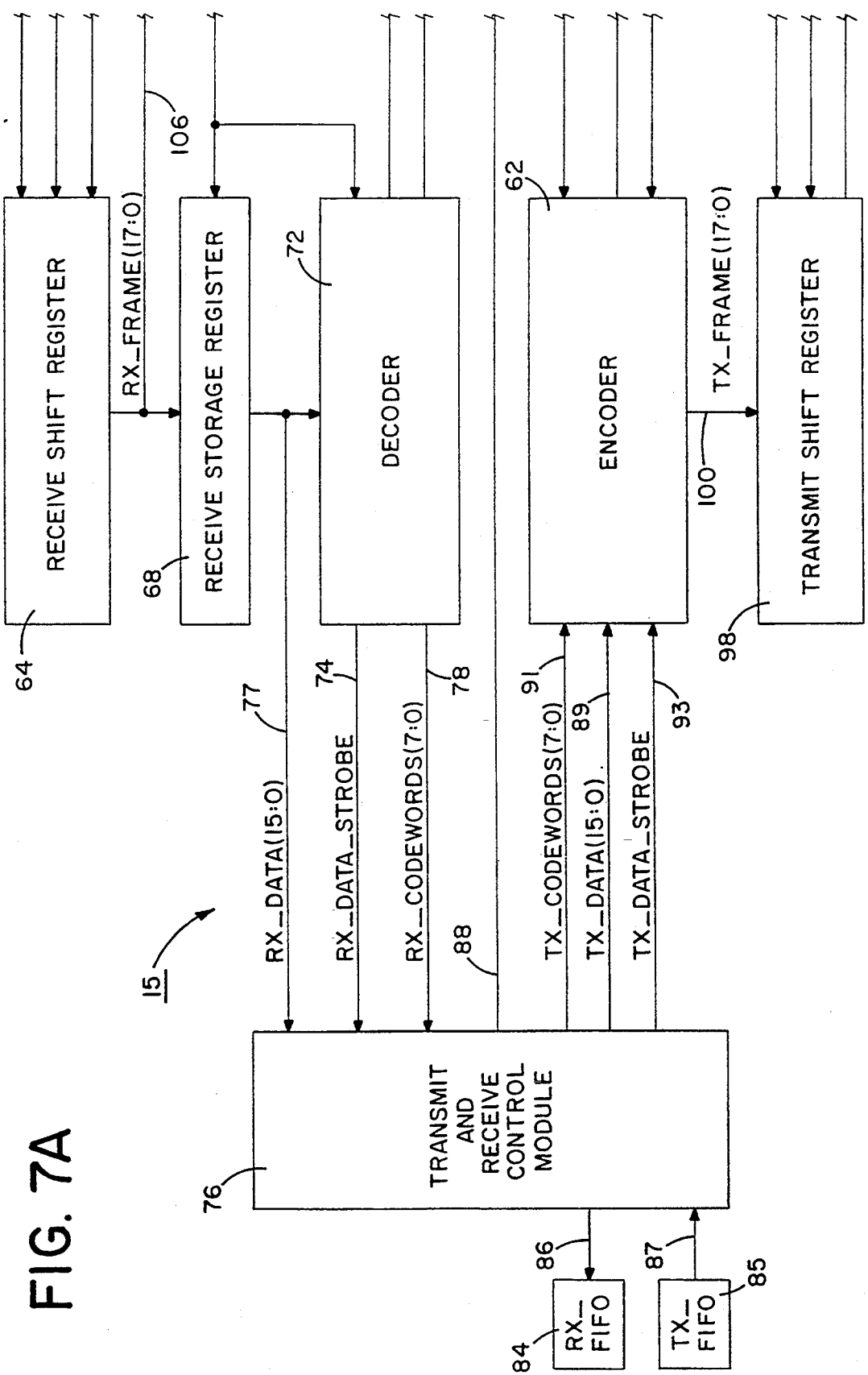

A block diagram of a preferred embodiment of a system 15 corresponding to Device B for implementing the state diagram of FIG. 5 is shown in FIG. 7. Most of the frame alignment functionality is contained in the receive frame control module 60 and the encoder module 62. A description of each module is presented below:

Receive Shift Register

The receive shift register 64 stores the most recent 18 bits received on the incoming data_in line 24. This data is clocked by a clock signal on a clock_in line 20. In the preferred embodiment one frame is equal to 18 bits. The contents of this shift register are cleared by activation of the receive register clear (rx_reg_clear) signal 66 generated by the receive frame control module 60. This signal is active whenever frame alignment must be re-established; that is, at power up and whenever a frame alignment error is detected. The signal deactivates when the receive shift register contents have been cleared as indicated by the register output 106. A receive storage register 68 is used to receive an entire frame of information units previously received by the receive shift register 64. The load_storage_reg signal 70 activated by the receive frame control module 60 controls receipt of this information by the receive storage register. This register temporarily stores the frame of information while its contents are decoded.

A decoder module 72 deciphers the contents of the frame of information whenever the load_storage_reg signal 70 activates. The decoder module determines if the frame of information contains data or control information (see FIG. 3) by examining the state of the first bit of the frame. If the frame contains data, the rx_data_strobe signal 74 is activated and transferred to the transmit and receive control module 76 along with the data (rx_data [15:0] 77). If the frame contains control information, then the corresponding code word (rx_codewords[7:0] 78) is transferred to the transmit and receive control module. The decoder performs parity checking for code words and also determines if the code word is a legal or illegal code word, (see Table 1). A parity error is notified to the receive frame control module by activating the parity_error signal 80 (see event 45, FIG. 5) and an illegal code word is notified to the receive frame control module by activation of the decode_error signal 82 (see event 46, FIG. 5).

The transmit and receive control module 76 passes data to and from receive FIFO (RX_FIFO) 84 and transmit FIFO (TX_FIFO) 85 so as to respectively communicate received data to other, unrelated, modules (not shown) and to obtain data for ultimate transmission on data_out line 26 with an associated outgoing clock signal on clock_out line 22. Buses 86 and 87 respectively connect receive FIFO 84 and transmit FIFO 85 to the transmit and receive control module 76. It also performs implementation of the communication protocol shown in FIG. 2. Thus when a control frame is received and it is determined by the transmit and receive control module that the code word, although legal, has been received at an inappropriate time, the transmit and receive control module activates the inappropriate_codeword signal 88 so as to inform the receive frame control module 60 (see event 47, FIG. 5). An example of such a situation is when a Connection Granted code word is received when no Connection Request code word was issued. Thus the activation of the inappropriate_codeword signal notifies the frame control module that a frame alignment error has been detected. Other inappropriate receipt of a code word scenarios are presented in Table 4. These scenarios may differ depending upon the communication protocol used in any implementation.

TABLE 4

Inappropriately Received Code Words
(Acronyms Defined in Table 1)

| TRANSMITTING DEVICE | RECEIVING DEVICE |
| --- | --- |
| CTS, ACK, or NACK is received while device is not sending or receiving information | END or a frame of information is received when not sending or receiving information |
| ACK received when the device has transmitted a RTS | RTS received when the device has transmitted a CTS or NACK |
| CTS or ACK received when the device has transmitted a frame of information | RTS received while the device is receiving information |
| CTS received when the device has transmitted an END | |

If data is to be transmitted, the transmit and receive module transfers this data to encoder 62 via tx_data [15:0] lines 89. Similarly, if a control frame is to be transmitted, the transmit and receive control module transfer the code words via tx_codewords[7:0] lines 91. A tx_data_strobe line 93 is activated to notify encoder 62 of the control or data information.

Encoder module 62 encapsulates outgoing frames of information for ultimate transmission on data_out line 26. This module also determines the correct coding for an outgoing control frame. When the encoder has a frame to transmit, it activates the send_frame signal 90.

The transmit frame control module 92 handles the frame transmission and returns activation of the frame_sent signal 94 when the frame has been transmitted. It should be noted however, that if the receive frame control module determines that the device is not in the aligned state 38 (see FIG. 5), it deactivates the frame_aligned signal 96 which in turn causes the encoder to repetitively generate the 'start of alignment sequence' (18 '1's) instead of control or data frames (see FIG. 5). The encoder module continues this action until the frame_aligned signal 96 is activated, at which time the encoder generates the 'end of alignment sequence', which in the preferred embodiment of the present invention is 17 '1's followed by a '0'.

The transmit shift register 98 provides data for the outgoing data stream on data_out line 26. Eighteen bits of parallel data are loaded into this register from the encoder module via tx_frame[17:0] lines 100. The data is then shifted out by the shift register onto data_out line 26. Both the loading of data into the register and the shifting of serial data from the register are controlled by the transmit frame control module.

The transmit frame control module 92 manages the transmission of frames. Thus when the encoder has a frame to transmit, the transmit frame control module causes the frame to be transferred to the transmit shift register by activating the tx_reg_load signal 102. The output shifting of data from the shift register is controlled by the tx_reg_shift signal 104.

Finally, the receive frame control module 60 is responsible for frame alignment; that is, the transition of states shown in FIG. 5. The receive frame control module enters the misaligned state 30 at power up or when a frame alignment error is detected. The frame_aligned signal 96 is deactivated at such times, forcing the repetitive transmission of the 'start of alignment sequence' on the data_out line 26. When in the misaligned state, the receive frame control module clears the receive shift register via activation of the rx_reg_clear signal 66. At such a time, the receive shift register contains all '0's.

The receive frame control module monitors the receive shift register 64 to determine when a 'start of alignment sequence' has been received. This monitoring is done via the rx_frame[17:0] lines 106 which also transfer frames of data to the receive storage register 68. When a 'start of alignment sequence' has been received, the receive frame control module changes state from the misaligned state to the realignment state 34. At this time, the frame_aligned signal 96 is activated.

The transition to the realignment state and the activating of the frame_aligned signal 96 causes the encoder module 62 to generate the 'end of alignment sequence' which, in the preferred embodiment of the present invention, is 17 '1's followed by a single '0'. Thus when the 'end of alignment sequence' is detected by the receive frame control module, it enters the aligned state 38 and activates the frame_aligned signal 96, thereby allowing encoder module to encapsulate and to cause the transmission of control and data frames on data_out line 26.

When the receive frame control module is in the aligned state, it monitors the incoming frames via the rx_frame[17:0] lines to determine if each frame has the proper frame ending marker (see FIG. 3). If the frame ending marker is not properly detected, the receive frame control enters the misaligned state (event 44, FIG. 5). As each frame of information is received by the receive frame control module, it also activates the load_storage_reg signal 70 so as to control movement of frames with respect to the receive storage register 68 and decoder module 72.

Frame Alignment Summary

Thus frame alignment errors are detected when the receive frame control module 60 loses track of the frame boundaries due to an error in the received information stream. An error can manifest itself in one of four ways previously set forth in Table 2 and shown in FIG. 5.

The detection of any of these frame alignment errors cause the receive frame control module to enter the misaligned state 30 which then initiates notification to the other device by generating the 'start of alignment sequence'. The 'start of alignment sequence' causes the other device to transition to the misaligned state, which in turn causes each device to enter the realignment and then the alignment state. The same 'start of alignment sequence' is used for both notifying and re-initializing each device, so that each device becomes aligned.

It will thus be seen that the objects set forth above and those made apparent from the preceding description, are efficiently attained and, since certain changes may be made in carrying out the method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described the invention, what is claimed is:

1. A method of aligning frames of information transmitted between at least two devices, wherein devices transmit pending frames of information and receive frames of information, comprising the steps of:
   1) initializing each device to a misaligned state;
   2) each device when in the misaligned state repetitively transmitting a 'start of alignment sequence';
   3) each device when in the misaligned state, transitioning to a realignment state upon receipt of a 'start of alignment sequence';
   4) each device when in the realignment state transmitting an 'end of alignment sequence';
   5) each device when in the realignment state remaining in said state until an 'end of alignment sequence' is received, at which time each said device transitions to an aligned state;
   6) each device when in the aligned state transmitting any pending frames of information; and
   7) each device when in the aligned state remaining in said state until a frame alignment error, with respect to any received frame of information, is detected, at which time said device transitions to the misaligned state, and further wherein at least the 'start of alignment sequence' is a frame alignment error.

2. A method of aligning frames of information as defined in claim 1, wherein each frame of information comprises P bits, where P is an integer greater than 2, and wherein the 'start of alignment sequence' comprises P bits all in a first logic state.

3. A method of aligning frames of information as defined in claim 2, wherein the 'end of alignment sequence' comprises a single bit in a second logic state.

4. A method of aligning frames of information as defined in claim 2, wherein the 'end of alignment sequence' comprises P bits, where the first P minus 1 bits are all in the first logic state and where the Pth bit is in the second logic state.

5. A method of aligning frames of information as defined in claim. 2, wherein the 'end of alignment sequence' comprises N multiples of P bits all in the first logic state, and ends with P minus 1 bits all in the first logic state and the Pth bit in the second logic state, where N is an integer greater than zero.

6. A method of aligning frames of information as defined in claim 4, wherein P equals 18.

7. A method of aligning frames of information as defined in claim 1, wherein the frames of information may comprise control frames and data frames and wherein a frame alignment error includes a parity error with respect to a control frame of information.

8. A method of aligning frames of information as defined in claim 7, wherein control frames of information represent code words and wherein a frame alignment error includes code words which are not within a set of code words that are defined as legal code words.

9. A method of aligning frames of information as defined in claim 8, wherein a frame alignment error includes detection of a legal code word at a time when the associated device would not normally receive such a code word.

10. A method of aligning frames of information as defined in claim 1, wherein each frame of information ends with a frame ending marker, and wherein a frame alignment error includes an improperly detected frame ending marker.

11. A method of aligning frames of information as defined in claim 1, further wherein each device when in the realignment state, if it fails to receive an 'end of alignment sequence' within a predetermined length of time after entering the realignment state, transitions to the misaligned state.

12. A method of aligning frames of information as defined in claim 1, wherein each device which is in the realignment state further transmits any pending frames of information after transmission of the 'end of alignment sequence'.

13. A method of aligning frames of information as defined in claim 2, wherein each device receives bits representing frames of information when an associated clock signal is in a first logic state, and wherein said clock signal is disabled when the device is transmitting frames of information.

14. A method of aligning frames of information as defined in claim 13, wherein the devices transmit and receive frames of information synchronously between devices in an asynchronous system.

15. A system for aligning frames of information transmitted between at least two devices, wherein devices transmit pending frames of information and receive frames of information, and wherein each frame of information comprises units of information, comprising:
   A) means for initializing each device to a misaligned state;

B) each device when in the misaligned state, having means for repetitively transmitting a 'start of alignment sequence';
C) each device when in the misaligned state, having means for transitioning to a realignment state upon receipt of a 'start of alignment sequence';
D) each device when in the realignment state transmitting an 'end of alignment sequence';
E) each device when in the realignment state having means for remaining in said state until an 'end of alignment sequence' is received, at which time each said device has means for transitioning to an aligned state;
F) each device when in an aligned state transmitting any pending frames of information; and
G) each device when in the aligned state having means for remaining in said state until a frame alignment error is detected, at which time said device has means for transitioning to the misaligned state, and further wherein at least a 'start of alignment sequence' is a frame alignment error.

16. A system for aligning frames of information as defined in claim 15, wherein the number of units of information for each frame of information comprises P bits, where P is an integer greater than 2, and wherein the 'start of alignment sequence' comprises P bits all in a first logic state.

17. A system for aligning frames of information as defined in claim 16, wherein the 'end of alignment sequence' comprises a single bit in a second logic state.

18. A system for aligning frames of information as defined in claim 16, wherein the 'end of alignment sequence' comprises P bits, where the first P minus 1 bits are all in the first logic state and where the Pth bit is in the second logic state.

19. A system for aligning frames of information as defined in claim 16, wherein the 'end of alignment sequence' comprises N multiples of P bits all in the first logic state, and ends with P minus 1 bits all in the first logic state and the Pth bit in the second logic state, where N is an integer greater than zero.

20. A system for aligning frames of information as defined in claim 18, wherein P equals 18.

21. A system for aligning frames of information as defined in claim 15, wherein the frames of information may comprise control frames and data frames and wherein a frame alignment error includes a parity error with respect to a control frame of information.

22. A system for aligning frames of information as defined in claim 21, wherein control frames of information represent code words and wherein a frame alignment error includes code words which are not within a set of code words that are defined as legal code words.

23. A system for aligning frames of information as defined in claim 22, wherein a frame alignment error includes detection of a legal code word at a time when the associated device would not normally receive such a code word.

24. A system for aligning frames of information as defined in claim 15, wherein each frame of information ends with a frame ending marker, wherein each device has means for detecting the frame ending marker, and wherein a frame alignment error includes an improperly detected frame ending marker.

25. A system for aligning frames of information as defined in claim 15, further wherein each device when in the realignment state, if it fails to receive an 'end of alignment sequence' within a predetermined length of time after entering the realignment state, has means for transitioning to the misaligned state.

26. A system for aligning frames of information as defined in claim 15, wherein each device which is in the realignment state further has means for transmitting any pending frames of information after transmission of the 'end of alignment sequence'.

27. A system for aligning frames of information as defined in claim 15, further comprising means for generating a clock signal when said device transmits units of information, and further comprises means for receiving a clock signal from another device; wherein the means for generating a clock signal disables said clock signal when no units of information are transmitted.

28. A system for aligning frames of information transmitted between at least two devices, wherein each frame of information comprises a first plurality of bits, with at least one bit in a second logic state designates the end of each frame, said system having means for interconnecting said devices to each other; said system further comprising for each device;
A) means for receiving and storing information (receive shift register 64) from the interconnecting means;
B) means (receive storage register 68) interconnected to the receiving and storing means, for assembling said received and stored information into frames;
C) means (60, 72, 76), interconnected to the receiving and storing means (64) and the receive storage register (68), for determining if a frame alignment error exists with respect to each received frame of information;
D) means (62, 92, 98), interconnected to the error determining means, for sequentially transmitting a first series of information bits all in a first logic state if a frame alignment error is detected;
E) means (62, 92, 98) for transmitting at least one bit of information in a second logic state if said device receives a first series of information bits all in a first logic state after said device has detected a frame alignment error; and
F) means (60) for entering an aligned state if said device has received at least one bit of information in the second logic state after receiving a series of information bits all in the first logic state after said device has detected a frame alignment error, and for causing the transmission of frames of information if said device is in the aligned state, wherein a frame alignment error includes detection of a first series of information bits all in a first logic state when said device is in the aligned state.

* * * * *